(12) United States Patent
Nakamura

(10) Patent No.: US 8,642,208 B2
(45) Date of Patent: Feb. 4, 2014

(54) SECONDARY BATTERY

(75) Inventor: Yoshiyuki Nakamura, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 867 days.

(21) Appl. No.: 12/373,647

(22) PCT Filed: Jul. 12, 2007

(86) PCT No.: PCT/JP2007/064301
§ 371 (c)(1),
(2), (4) Date: Jan. 13, 2009

(87) PCT Pub. No.: WO2008/010564
PCT Pub. Date: Jan. 24, 2008

(65) Prior Publication Data
US 2010/0009250 A1  Jan. 14, 2010

(30) Foreign Application Priority Data

Jul. 19, 2006  (JP) ................................. 2006-196981

(51) Int. Cl.
*H01M 4/02* (2006.01)

(52) U.S. Cl.
USPC ....................................................... 429/209

(58) Field of Classification Search
USPC ....................................................... 429/210
See application file for complete search history.

(56) References Cited

U.S. PATENT DOCUMENTS

| 6,887,620 B2 * | 5/2005 | Klein et al. ............... 429/210 |
| 7,803,486 B2 | 9/2010 | Nakamura | |

| 2004/0253512 A1 | 12/2004 | Watanabe et al. |
| 2005/0132562 A1 | 6/2005 | Saito et al. |
| 2006/0281007 A1 | 12/2006 | Tsutsumi et al. |

FOREIGN PATENT DOCUMENTS

| JP | 10-149820 | * | 6/1998 | ............... H01M 4/32 |
| JP | 2001015146 A | | 1/2001 | |
| JP | 2003-346892 A | | 12/2003 | |
| JP | 2004-031255 A | | 1/2004 | |
| JP | 2004-095400 A | | 3/2004 | |
| JP | 2005-5163 A | | 1/2005 | |
| JP | 2005-11660 A | | 1/2005 | |
| JP | 2005-050756 A | | 2/2005 | |
| JP | 2005-174691 A | | 6/2005 | |
| JP | 2005-183287 A | | 7/2005 | |

OTHER PUBLICATIONS

IPDL machine translation of JP 10-149820 printed Jun. 10, 2011.*
Office Action issued on Jun. 9, 2011 in U.S. Appl. No. 12/297,262.

* cited by examiner

*Primary Examiner* — Maria J Laios
(74) *Attorney, Agent, or Firm* — Kenyon & Kenyon LLP

(57) ABSTRACT

A secondary battery includes: a battery module including an electrolyte layer in a form of a plate, a positive electrode disposed on a first main surface of the electrolyte layer and containing a positive electrode active material, and a negative electrode disposed on a second main surface of the electrolyte layer and containing a negative electrode active material; and a conductive layer provided between battery modules, the secondary battery having more than one battery module and more than one conductive layer stacked in layers, wherein the positive electrode active material and the negative electrode active material are set in concentration in accordance with a temperature distribution in the secondary battery.

6 Claims, 7 Drawing Sheets

SECONDARY BATTERY

This is a 371 national phase application of PCT/JP2007/064301 filed 12 Jul. 2007, claiming priority to Japanese Patent Application No. 2006-196981 filed 19 Jul. 2006, the contents of which are incorporated herein by reference.

FIELD OF THE INVENTION

The present invention relates to secondary batteries configured of a plurality of battery modules stacked in layers.

BACKGROUND OF THE INVENTION

Conventionally, a secondary battery has been known that is configured of a plurality of battery cells that each include an electrolyte layer and a positive electrode and a negative electrode each disposed on a surface of the electrolyte layer and are stacked in layers with a collector plate posed therebetween, as proposed for example in Japanese Patent Laying-Open Nos. 2004-031255, 2004-095400, 2005-174691, 2005-050756 and 2005-011660.

Such a secondary battery is utilized as a storage battery, and an electrode reaction caused between the positive electrode and the negative electrode causes discharging.

Such a secondary battery as described above has an inner portion and an end portion which are different in heat radiation efficiency and the inner portion has a tendency to have higher temperature. As such, a battery cell located at the inner portion has an active electrode reaction and thus degrades faster, resulting in the secondary battery as a whole having a reduced life.

Furthermore, even if each battery cell is driven normally, it outputs a voltage that is not uniform, depending on the secondary battery's internal temperature distribution. Even if each battery cell's output voltage is sensed and a battery cell that deviates from a predetermined voltage can be detected, it is difficult to determine whether the deviation is attributed to that battery cell's defect or to temperature. Thus in the conventional secondary battery it is difficult to identify a defective battery cell.

SUMMARY OF THE INVENTION

The present invention has been made in view of the above disadvantage, and one object thereof is to allow a secondary battery that has portions different in heat radiation efficiency and does not have its battery cells uniform in temperature to also have each battery cell outputting less varying voltage, current and the like to provide the secondary battery with an increased life. Furthermore, a second object of the present invention is to provide a secondary battery allowing a defective battery cell to be identified more accurately.

The present secondary battery in one aspect includes: a battery module including an electrolyte layer in a form of a plate, a positive electrode disposed on a first main surface of the electrolyte layer and containing a positive electrode active material and a first additive, and a negative electrode disposed on a second main surface of the electrolyte layer and containing a negative electrode active material and a second additive; and a conductive layer disposed between the battery module and another battery module, the secondary battery having more than one battery module and more than one conductive layer stacked in layers, wherein the positive electrode active material and the first additive configuring each positive electrode are, in total, fixed in mass and the negative electrode active material and the second additive configuring each negative electrode are, in total, fixed in mass and the positive electrode active material and the negative electrode active material are varied in content to be set in concentration in accordance with a temperature distribution in the secondary battery. Preferably, the battery module includes a first battery module and a second battery module becoming higher in temperature than the first battery module, and the positive electrode active material and the negative electrode active material contained in the second battery module are lower in concentration than the positive electrode active material and the negative electrode active material contained in the first battery module. Preferably, and the first additive and the second additive are added in an amount set in accordance with the temperature distribution in the secondary battery.

The present secondary battery in another aspect includes: a battery module including an electrolyte layer in a form of a plate, a positive electrode disposed on a first main surface of the electrolyte layer and containing a positive electrode active material and a first additive, and a negative electrode disposed on a second main surface of the electrolyte layer and containing a negative electrode active material and a second additive; and a conductive layer disposed between the battery module and another battery module, the secondary battery having more than one battery module and more than one conductive layer stacked in layers, wherein the positive electrode active material and the first additive configuring each positive electrode are, in total, fixed in mass and the negative electrode active material and the second additive configuring each negative electrode are, in total, fixed in mass, and more than one battery module has higher temperatures at inner portions of the secondary battery than at an end face of the secondary battery in a direction in which the battery module is stacked in layers, and the positive electrode and the negative electrode contain the positive electrode active material and the negative electrode active material, respectively, tapered in concentration from the end face of the secondary battery toward the inner portions of the secondary battery in the direction in which the battery module is stacked in layers. Preferably, the battery module located at the inner portion as seen in the direction in which the battery module is stacked in layers provides an output serving as a reference output, and each battery module has the positive electrode and the negative electrode containing the positive electrode active material and the negative electrode active material, respectively, set in concentration to allow each battery module to provide the reference output. Preferably, the battery module located at the end face provides an output serving as a reference output, and each battery module has the positive electrode and the negative electrode containing the positive electrode active material and the negative electrode active material, respectively, set in concentration to allow each battery module to provide the reference output.

The present secondary battery can contain a negative electrode active material and a positive electrode active material set in concentration in accordance with the secondary battery's internal temperature distribution to allow a battery module higher in temperature to contain the positive electrode active material and the negative electrode active material lower in concentration. This allows each battery module to provide an output uniformly to prevent a particular battery module from degrading alone. Furthermore, the secondary battery can have each battery module providing an approximated output. This allows a defective cell to be identified by sensing an output of each battery module.

DETAILED DESCRIPTION

Figure 1:
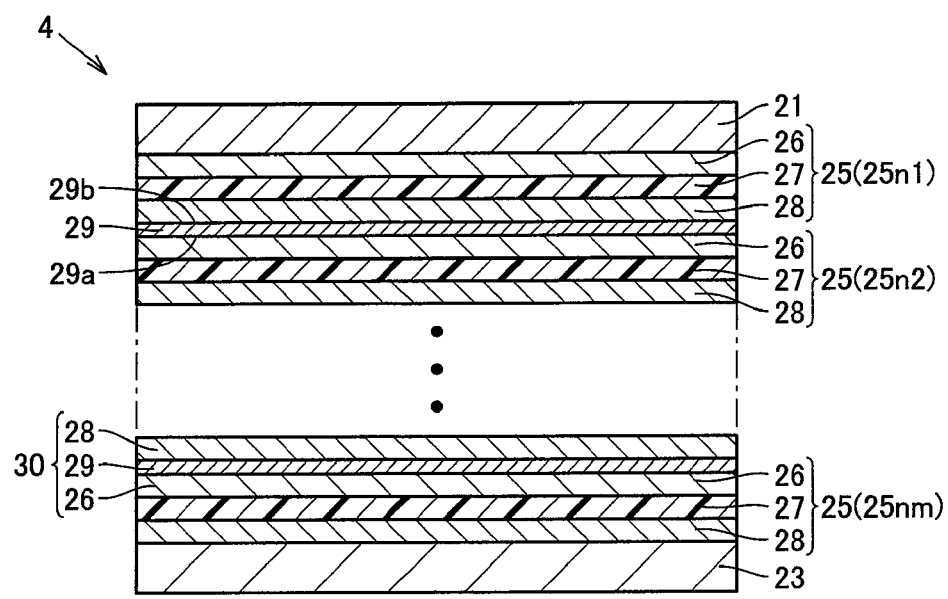
FIG. 1 is a cross section of a bipolar secondary battery according to an embodiment.

With reference to FIG. 1 to FIG. 13, an embodiment provides a bipolar secondary battery 4, as will be described hereinafter. FIG. 1 is a cross section of the bipolar secondary battery according to the present embodiment. As shown in FIG. 1, bipolar secondary battery 4 is formed of a plurality of electrode sheets (or battery modules) 25 stacked in layers with a collector foil (a conductive film) 29 posed therebetween. Bipolar secondary battery 4 is generally rectangular parallelepiped.

Bipolar secondary battery 4 is accommodated in a casing (not shown) and mounted for example in a hybrid vehicle, an electric vehicle or the like. Bipolar secondary battery 4 includes a positive electrode collector plate 23 provided at one end face of electrode sheet 25 as seen in a direction in which electrode sheets 25 are stacked in layers, and a negative electrode collector plate 21 provided at the other end face of electrode sheet 25 as seen in the same direction.

Positive electrode collector plate 23 and negative electrode collector plate 21 are each provided with a terminal portion projecting from the casing outward and connected to an interconnection line connected to a power control unit (PCU) or a similar external member.

As such, heat is radiated from the terminal portion to outside the casing or from a surface of positive electrode collector plate 23 and that of negative electrode collector plate 21 externally through the casing. Bipolar secondary battery 4 thus radiates heat more efficiently at the end face than at the center portion.

The bipolar secondary battery is thus internally heated, and accordingly, electrode sheets 25 located at inner portions of bipolar secondary battery 4 have higher temperatures than electrode sheet 25 located at the end face of bipolar secondary battery 4.

Electrode sheet 25 includes an electrolyte layer 27 in the form of a plate, a positive electrode 28 disposed on one main surface of electrolyte layer 27, and a negative electrode 26 disposed on the other main surface of electrolyte layer 27. Each electrode sheet 25 is connected in series via a collector foil (conductive film) 29. More specifically, an electrode sheet 25n1 is provided in contact with a lower surface of negative electrode collector plate 21 and an electrode sheet 25n2 is provided adjacent to electrode sheet 25n1 via conductive foil 29, and furthermore, a plurality of electrode sheets are stacked in layers. Finally, an electrode sheet 25nm is provided on an upper surface of positive electrode collector plate 23, and in the present embodiment m electrode sheets 25 are deposited in layers, wherein m is a positive number.

Note that negative electrode 26 is provided by sputtering a negative electrode active material, an additive and the like to apply them on one surface of collector foil 29, and positive electrode 28 is provided by sputtering a positive electrode active material, an additive and the like to apply them on the other surface of collector foil 29.

Positive electrode 28 and negative electrode 26 contain the positive electrode active material and the negative electrode active material, respectively, set in concentration in accordance with a temperature distribution in bipolar secondary battery 4 that is provided when bipolar secondary battery 4 is driven.

More specifically, when bipolar secondary battery 4 is driven, one electrode sheet (a second battery module) 25 is increased in temperature to be higher in temperature than another electrode sheet (a first battery module) 25. Accordingly, one electrode sheet 25 has its positive and negative electrode active materials set to be lower in concentration than the other electrode sheet 25 does.

Thus when bipolar secondary battery 4 is driven and fails to have an internal temperature in a uniform distribution and electrode sheet 25 located at some position has a different, higher temperature, electrode sheet 25 can be prevented from having an active electrode reaction. This can prevent electrode sheets 25 from failing to discharge currents, respectively, in a uniform amount and have uniform voltage, and thus allows electrode sheets 25 to provide their respective outputs uniformly.

Electrode sheets 25 that can provide their respective outputs uniformly can be prevented from having a particular electrode sheet 25 degrading alone, and bipolar secondary battery 4 can thus have an increased life.

In the present embodiment, bipolar secondary battery 4 having electrode sheets 25 stacked in layers in a direction has higher temperatures at portions located at inner portions than at an end face, as seen in that direction.

Accordingly, preferably, electrode sheet 25 has positive electrode 28 and negative electrode 26 with their respective positive electrode active material and negative electrode active material tapered in concentration from the end face of bipolar secondary battery 4 toward the inner portion of bipolar secondary battery 4 as seen in the direction in which electrode sheets 25 are stacked in layers. If there is caused a variation in temperature as seen in the direction in which electrode sheets 25 are stacked in layers, electrode sheets 25 can nonetheless provide their respective outputs uniformly.

Each electrode sheet 25 may have positive electrode 28 and negative electrode 26 with their respective positive and negative electrode active materials adjusted in concentration in a method as follows: each positive electrode 28 may internally contain the positive electrode active material in a fixed amount and each negative electrode 26 may internally contain the negative electrode active material in a fixed amount, while each positive electrode 28 may internally contain an additive (a first additive) in an adjusted amount and each negative electrode 26 may internally contain an additive (a second additive) in an adjusted amount.

In the FIG. 1 bipolar secondary battery 4, positive electrodes 28 and negative electrodes 26 contain their respective additives in an amount tapered, as seen from an inner portion of bipolar secondary battery 4 toward the end face of bipolar secondary battery 4 in the direction in which electrode sheets 25 are stacked in layers, and positive electrodes 28 and negative electrodes 26 contain the positive electrode active material and the negative electrode active material, respectively, increased in content toward the inner portion of bipolar secondary battery 4.

Positive and negative electrodes 28 and 26 can thus contain the positive and negative electrode active materials, respectively, increased in concentration toward the end face of bipolar secondary battery 4, and can also be tapered in thickness toward the end face of bipolar secondary battery 4 to allow bipolar secondary battery 4 to be compact in configuration.

Each positive electrode 28 and each negative electrode 26 may contain their respective, positive and negative electrode active materials, adjusted in concentration in a method as follows: each positive electrode 28 may be configured of a positive electrode active material and an additive in total having a fixed mass and each negative electrode 26 may be configured of a negative electrode active material and an additive in total having a fixed mass, while the positive electrode active material and the negative electrode active material may be varied in content. Each positive electrode 28 and each negative electrode 26 that can have their respective, positive and negative electrode active materials set in concentration as described above do not vary in volume in comparison with a conventional bipolar secondary battery. This allows a casing that has conventionally been used for a bipolar secondary battery to be used for bipolar secondary battery 4.

Figure 2:
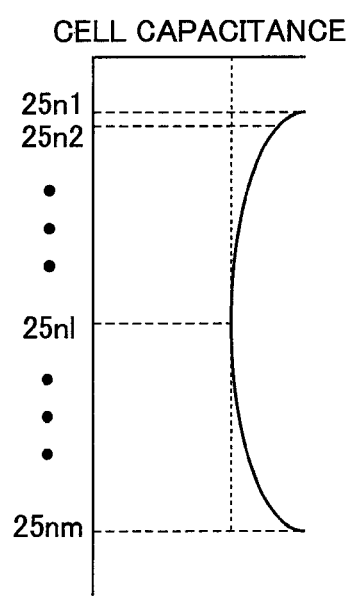
FIG. 2 is a graph representing a concentration distribution of a positive electrode active material and a negative electrode active material.
Figure 3:
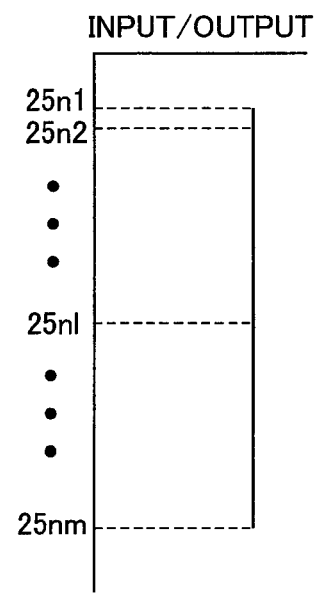
FIG. 3 is a graph representing a distribution of a value input/output (or an amount of a current) to/from the bipolar secondary battery when the positive electrode active material and the negative electrode active material have a concentration distribution set as shown in FIG. 2.
Figure 4:
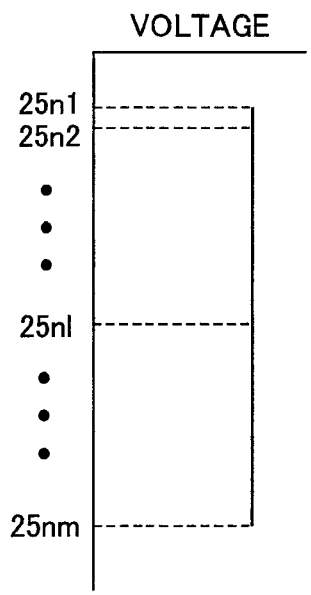
FIG. 4 is a graph representing a distribution of a voltage output for each electrode sheet.
Figure 5:
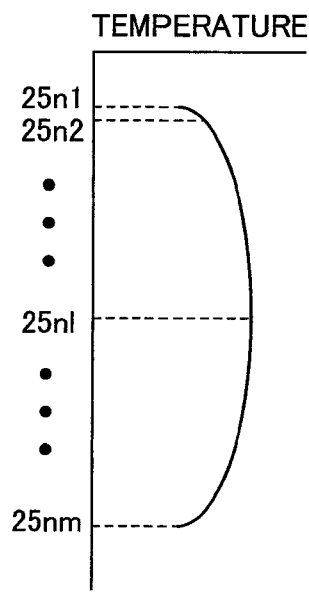
FIG. 5 is a graph representing a temperature distribution of the bipolar secondary battery, as provided when the positive electrode active material and the negative electrode active material have a concentration distribution set as shown in FIG. 2.

FIG. 2 is a graph representing a concentration distribution of a positive electrode active material and a negative electrode active material. FIG. 3 is a graph representing a distribution of a value input/output (or an amount of a current) to/from bipolar secondary battery 4 when the positive electrode active material and the negative electrode active material have a concentration distribution set as shown in FIG. 2. FIG. 4 is a graph representing a distribution of a voltage output for each electrode sheet. Furthermore, FIG. 5 is a graph representing a temperature distribution of bipolar secondary battery 4, as provided when the positive electrode active material and the negative electrode active material have a concentration distribution set as shown in FIG. 2. FIG. 2 to FIG. 13 each have an axis of ordinates representing the FIG. 1 electrode sheets 25$n$1-25$nm$, with electrode sheet 25$n$1 indicating an electrode sheet located at a center as seen in the direction in which electrode sheets 25$n$1-25$nm$ are stacked in layers.

The FIG. 2 concentration distribution of the positive electrode active material and the negative electrode active material as seen in the direction in which bipolar secondary battery 4 has layers stacked, is set to correspond to the FIG. 5 temperature distribution of bipolar secondary battery 4 as seen in the direction in which bipolar secondary battery 4 has layers stacked.

Thus, as shown in FIG. 3 and FIG. 4, electrode sheets 25$n$1-25$nm$ output generally equal voltages, respectively, and currents in generally equal amounts, respectively, and thus provide a predetermined voltage and a predetermined current.

Thus, when bipolar secondary battery 4 is driven, electrode sheets 25$n$1-25$nm$ each output a voltage or the like that is the predetermined voltage. This allows electrode sheet 25 that is defective and accordingly outputs a voltage or the like deviating from the predetermined voltage to be readily identified by sensing a voltage or the like output from each electrode sheet 25$n$1-25$nm$.

Conventionally, a normally driven bipolar secondary battery's electrode sheets 25$n$1-25$nm$ do not output voltage uniformly, and it is thus significantly difficult to identify which one of electrode sheets 25$n$1-25$nm$ is defective. In contrast, bipolar secondary battery 4 in the present embodiment can facilitate identifying which one of electrode sheets 25$n$1-25$nm$ is defective.

Furthermore, in the FIG. 2 example, electrode sheet 25$n$1 located at an inner portion as seen in the direction in which electrode sheets 25$n$1-25$nm$ are stacked in layers provides an output serving as a reference output, and a setting is done to allow each electrode sheet 25$n$1-25$nm$ to output the reference output. Electrode sheet 25$n$1 located at a center of bipolar secondary battery 4 is readily increased in temperature when bipolar secondary battery 4 is driven. Accordingly, the reference output can also be high and bipolar secondary battery 4 can thus provide increased total output voltage and current.

A specific concentration distribution is provided as follows: electrode sheet 25$n$1 located at the center of electrode sheets 25$n$1-25$nm$ as seen in the direction in which electrode sheets 25$n$1-25$nm$ are stacked in layers has positive electrode 28 and negative electrode 26 containing the positive electrode active material and the negative electrode active material, respectively, to have a concentration of approximately 85%, and electrode sheets 25$n$1 and 25$nm$ each located at an end face of bipolar secondary battery 4 each have positive electrode 28 and negative electrode 26 containing the positive electrode active material and the negative electrode active material, respectively, to have a concentration set at approximately 95%

Figure 6:
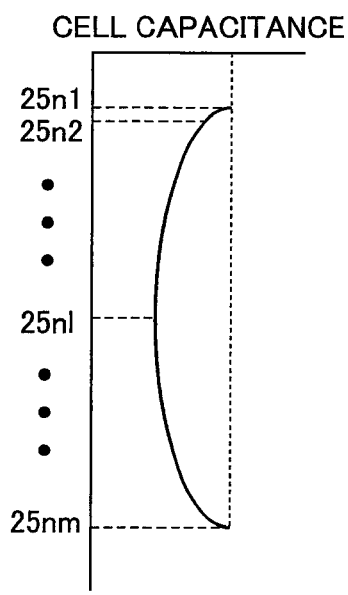
FIG. 6 is a graph representing a concentration distribution provided when an electrode sheet 25 located at an end face of the bipolar secondary battery serves to provide a reference output and each electrode sheet 25 has a positive electrode and a negative electrode containing a positive electrode active material and a negative electrode active material, respectively, set in concentration to allow each electrode sheet 25 to provide the reference output.

FIG. 6 is a graph representing a concentration distribution provided when electrode sheet 25$n$1, 25$nm$ located at an end face of bipolar secondary battery 4 serves to provide a reference output and each electrode sheet 25$n$1-25$nm$ has a positive electrode and a negative electrode containing a positive electrode active material and a negative electrode active material, respectively, set in concentration to allow each electrode sheet 25$n$1-25$nm$ to provide the reference output.

More specifically, electrode sheets $25n1$ and $25nm$ each located at the end face each contain the positive electrode active material and the negative electrode active material to have a concentration of approximately 85%, and electrode sheet $25n1$ located at the center in the direction in which the layers are stacked contains the positive electrode active material and the negative electrode active material to have a concentration of approximately 75%.

Setting the positive electrode active material and the negative electrode active material in concentration as described above can reduce the amount of the positive electrode active material that is required and the amount of the negative electrode active material that is required. Bipolar secondary battery 4 can thus be configured at a reduced cost.

Figure 7:
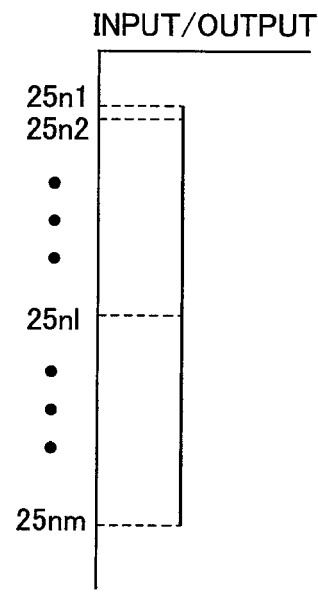
FIG. 7 is a graph representing a current output from each electrode sheet when a positive electrode active material and a negative electrode active material are set in concentration, as shown in FIG. 6.
Figure 8:
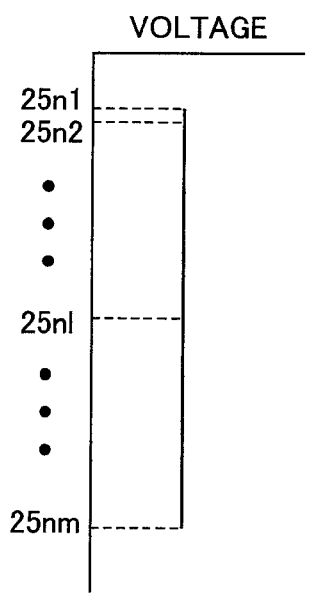
FIG. 8 is a graph representing a voltage output from each electrode sheet when a positive electrode active material and a negative electrode active material are set in concentration, as shown in FIG. 6.

FIG. 7 is a graph representing a current output from each electrode sheet $25n1$-$25nm$ when a positive electrode active material and a negative electrode active material are set in concentration, as shown in FIG. 6. FIG. 8 is a graph representing a voltage output from each electrode sheet $25n1$-$25nm$ when a positive electrode active material and a negative electrode active material are set in concentration, as shown in FIG. 6. Furthermore, FIG. 9 is a graph representing a temperature distribution internal to bipolar secondary battery 4, as provided when a positive electrode active material and a negative electrode active material are set in concentration, as shown in FIG. 6.

Figure 9:
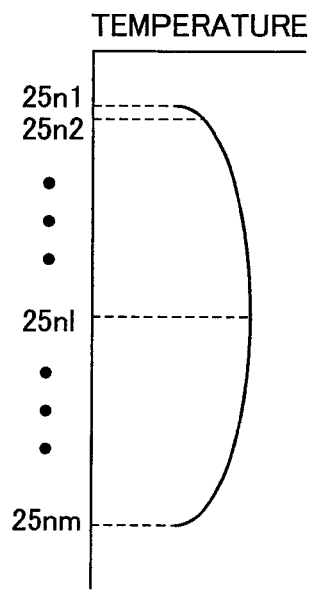
FIG. 9 is a graph representing a temperature distribution internal to the bipolar secondary battery, as provided when a positive electrode active material and a negative electrode active material are set in concentration, as shown in FIG. 6.

Bipolar secondary battery 4 shown in FIG. 7 to FIG. 9 also has the positive electrode active material and the negative electrode active material set in concentration in accordance with a temperature distribution in bipolar secondary battery 4, and each electrode sheet $25n1$-$25nm$ outputs a voltage and a current uniformly, as shown in FIG. 7 and FIG. 8.

Thus this bipolar secondary battery 4 can also facilitate identifying which one of electrode sheets $25n1$-$25nm$ is defective by sensing a voltage or the like output from each electrode sheet $25n1$-$25nm$.

Figure 10:
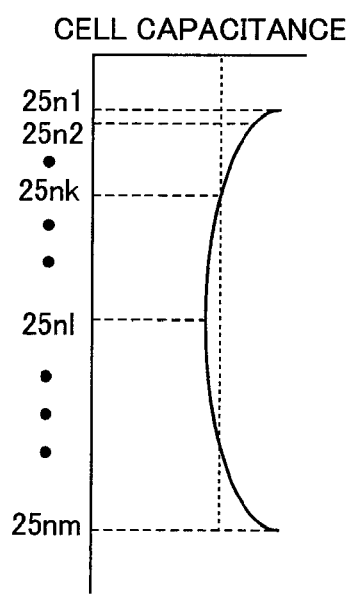
FIG. 10 is a graph representing a concentration distribution of a positive electrode active material and a negative electrode active material of an electrode sheet, as provided when an electrode sheet located between a center of the bipolar secondary battery and an end face of the bipolar secondary battery serves to provide a reference output.

As shown in FIG. 10, an electrode sheet $25k$ located between a center of bipolar secondary battery 4 and an end face of bipolar secondary battery 4 may provide an output serving as a reference output, and the other electrode sheets 25 may contain the positive electrode active material and the negative electrode active material, set in concentration accordingly, wherein k is a positive number, and $1<k<1<m$.

More specifically, electrode sheets $25n1$ and $25nm$ each located at the end face each contain the positive electrode active material and the negative electrode active material to have a concentration of 90%, and electrode sheet $25n1$ located at the center contains the positive electrode active material and the negative electrode active material to have a concentration of approximately 80%.

Figure 13:
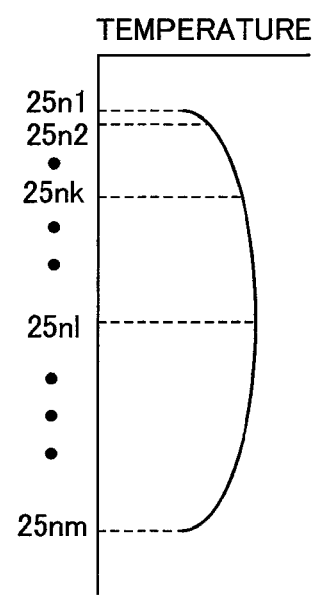
FIG. 13 is a graph representing a temperature distribution of the bipolar secondary battery having a positive electrode active material and a negative electrode active material set in concentration as shown in FIG. 10, as seen in a direction in which the bipolar secondary battery has layers stacked.

FIG. 13 is a graph representing a temperature distribution of bipolar secondary battery 4 having a positive electrode active material and a negative electrode active material set in concentration as shown in FIG. 10, as seen in a direction in which the bipolar secondary battery has layers stacked, and a concentration distribution of the positive and negative electrode active materials of electrode sheets $25n1$-$25nm$ is set in accordance with the bipolar secondary battery 4 internal temperature distribution.

Figure 11:
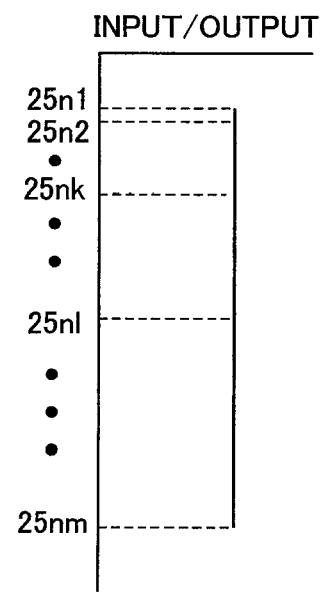
FIG. 11 is a graph representing a current output from each electrode sheet when a positive electrode active material and a negative electrode active material are set in concentration, as shown in FIG. 10.
Figure 12:
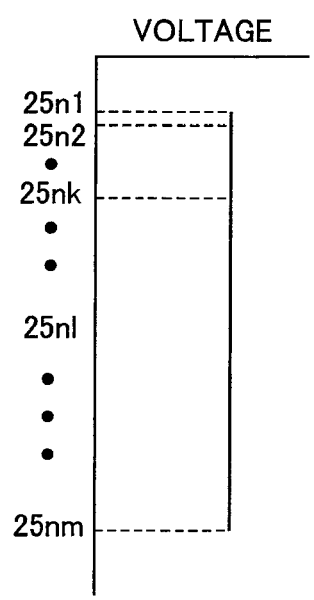
FIG. 12 is a graph representing a voltage output from each electrode sheet when a positive electrode active material and a negative electrode active material are set in concentration, as shown in FIG. 10.

FIG. 11 is a graph representing a current output from each electrode sheet $25n1$-$25nm$ when a positive electrode active material and a negative electrode active material are set in concentration, as shown in FIG. 10. FIG. 12 is a graph representing a voltage output from each electrode sheet $25n1$-$25nm$ when a positive electrode active material and a negative electrode active material are set in concentration, as shown in FIG. 10. As shown in FIG. 11 and FIG. 12, each electrode sheet $25n1$-$25nm$ outputs a voltage and a current uniformly.

As described above, the output of each electrode sheet 25 is uniformed by noting a variation in a temperature distribution as seen in a direction in which electrode sheets 25 are stacked in layers. However, this is not limited as described above.

For example, each positive electrode 28 and each negative electrode 26 also vary in temperature in the direction of the main surface, and also have therein at some locations a portion having an active electrode reaction and a portion having a less active electrode reaction.

For example, the terminal portion readily increases in temperature at a connection portion having an interconnection line connected thereto. Accordingly, in electrode sheets 25 adjacent to positive electrode collector plate 23 and negative electrode collector plate 21, a portion located in a vicinity of the connection portion readily increases in temperature in comparison with other portions.

Accordingly, each individual electrode sheet 25 can also be decreased in concentration at a portion thereof that is increased in temperature, and increased in concentration at a portion thereof that is low in temperature, to also prevent each individual electrode sheet 25 from having partial degradation.

In FIG. 1, electrolyte layer 27 is a layer formed of a material having ion conductivity. Electrolyte layer 27 may be a solid electrolyte, or gelled electrolyte. By interposing electrolyte layer 27, smooth ion conduction can be achieved between positive electrode 28 and negative electrode 26, and the bipolar secondary battery can provide an improved output.

Note that a bipolar electrode 30 is disposed between electrolyte layers 27 and includes collector foil 29, positive electrode 28 disposed on one main surface of collector foil 29, and negative electrode 26 disposed on the other main surface of collector foil 29.

Negative electrode collector plate 21 in the form of a plate and positive electrode collector plate 23 in the form of a plate are included, each at an end face of bipolar secondary battery 4 located at an end portion as seen in the direction in which electrode sheets 25 are stacked in layers.

Negative electrode collector plate 21 has one main surface in contact with negative electrode 26 of electrode sheet 25 adjacent to negative electrode collector plate 21 in the direction in which electrode sheets 25 are stacked in layers. Furthermore, positive electrode collector plate 23 has one main surface in contact with positive electrode 28 of electrode sheet 25 adjacent to positive electrode collector plate 23 in the direction in which electrode sheets 25 are stacked in layers.

Bipolar secondary battery 4 thus configured has a configuration, as described hereinafter. Collector foil 29 is formed, for example, of aluminum. Here, even if an active material layer provided on a surface of collector foil 29 contains solid polymer electrolyte, it is possible to ensure sufficient mechanical strength of collector foil 29. Collector foil 29 may be formed by providing aluminum coating on a surface of metal other than aluminum, such as copper, titanium, nickel, stainless steel (SUS) or an alloy of these metals.

Positive electrode 28 includes a positive electrode active material and a solid polymer electrolyte or a similar additive. Furthermore, positive electrode 28 may contain as an additive a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the positive electrode active material, a composite oxide of lithium and transition metal generally used in a lithium ion secondary battery may be used. Examples of the positive electrode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite oxide such as $LiFeO_2$. Other examples are a phosphate compound or a sulfate compound of transition metal and lithium such as $LiFePO_4$; an oxide or sulfide of transition metal such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or a copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of positive electrode 28 and negative electrode 26. More preferably, the solid polymer electrolyte is included in both positive electrode 28 and negative electrode 26.

As the supporting salt, $Li(C_2F_5SO_2)_2N$, $LiBF_4$, $LiPF_6$, $LiN(SO_2C_2F_5)_2$ or a mixture of these may be used. As the electron conduction assistant, acetylene black, carbon black, graphite or the like may be used.

Negative electrode 26 includes a negative electrode active material and a solid polymer electrolyte or a similar additive. The negative electrode active material may contain as an additive a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the negative electrode active material, a material generally used in a lithium ion secondary battery may be used. If a solid electrolyte is used, however, it is preferred to use a composite oxide of carbon or lithium and metal oxide or metal as the negative electrode active material. More preferably, the negative electrode active material is a composite oxide of carbon or lithium and transition metal. Further preferably, the transition metal is titanium. Specifically, it is more preferred that the negative electrode active material is of a composite oxide of titanium oxide or titanium and lithium.

As the solid electrolyte forming electrolyte layer 27, by way of example, a solid polymer electrolyte such as polyethylene oxide (PEO), polypropylene oxide (PPO) or a copolymer of these may be used. The solid electrolyte contains a supporting salt (lithium salt) for ensuring ion conductivity. As the supporting salt, $LiBF_4$, $LiPF_6$, $LiN(SO_2CF_3)_2$, $LiN(SO_2C_2F_5)_2$ or a mixture of these may be used.

Specific examples of materials for positive electrode 28, negative electrode 26 and electrolyte layer 27 are listed in Tables 1-3. Table 1 shows specific examples when electrolyte layer 27 is of an organic solid electrolyte. Table 2 shows specific examples when electrolyte layer 27 is of an inorganic solid electrolyte. Table 3 shows specific examples when electrolyte layer 27 is of a gel electrolyte.

TABLE 1

| Positive electrode material | Negative electrode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVdF base | — |
| $LiCoO_2$ | Li metal | ether based polymer P(EO/EM/AGE) | electrolyte salt: LiTFSI<br>ion conducting material binder:<br>mix P(EO/EM) + $LiBF_4$ to positive electrode |
| $Li_{0.33}MnO_2$ | Li metal | P(EO/EM/AGE) | electrolyte salt: LiTFSI<br>ion conducting material binder: mix PEO-based solid polymer + LiTFSI to positive electrode |
| $Li_{0.33}MnO_2$ | Li metal | PEO base + inorganic additive | electrolyte salt: $LiClO_4$<br>ion conducting material:<br>mix KB + PEG + LiTFSI to positive electrode |
| — | — | PEG-PMMA + PEG-borate ester | electrolyte salt: LiTFSI, BGBLi |
| — | — | PEO base + 10 mass %$0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material:<br>mix KB + PVdF + PEG + LiTFSI to positive electrode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material:<br>mix KB + PVdF + PEG + LiTFSI to positive electrode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to positive electrode |
| — | — | PME400 + Group 13 metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>positive electrode conducting material KB+ binder PVdF |
| $LiCoO_2$ | Li metal | P(EO/EM) + ether based plasticizer | electrolyte salt: LiTFSI<br>positive electrode conducting material KB+ binder PVdF |

TABLE 2

| Positive electrode material | Negative electrode material | Solid Electrolyte | Remarks |
|---|---|---|---|
| $LiCoO_2$ | In | $95(0.6Li_2S \cdot 0.4SiS_2) \cdot 5Li_4SiO_4$ ($Li_2S$—$SiS_2$ based melt rapid cooled glass) | state: glass |
| — | — | $70Li_2S \cdot 30P_2S_5 \, Li_{1.4}P_{0.6}S_{2.2}$ sulfide glass ($Li_2S$—$P_2S_5$ based glass ceramics) | state: glass<br>forming method: mechanochemical |
| — | — | $Li_{0.35}La_{0.55}TiO_3$(LLT) (perovskite type structure) | state: ceramics<br>form solid electrolyte porous body, fill pores with active material sol |
| — | — | $80Li_2S \cdot 20P_2S_5$ ($Li_2S$—$P_2S_5$ based glass ceramics) | state: glass<br>forming method: mechanochemical |
| — | — | $xSrTiO_3 \cdot (1-x)LiTaO_3$ (perovskite type oxide) | state: ceramics |
| $LiCoO_2$ | Li-In metal | $Li_{3.4}Si_{0.4}P_{0.6}S_4$ (thio-LISICON Li ion conductor) | state: ceramics |
| — | — | $(Li_{0.1}La_{0.3})_xZr_yNb_{1-y}O_3$ (perovskite type oxide) | state: ceramics |
| — | — | $Li_4B_7O_{12}Cl$ | state: ceramics<br>combine PEG as organic compound |
| — | — | $Li_4GeS_4$—$Li_3PS_4$ based crystal $Li_{3.25}Ge_{0.25}P_{0.75}S_4$ (thio-LISICON Li ion conductor) | state: ceramics |
| — | Li metal<br>In metal | $0.01Li_3PO_4$—$0.63Li_2S$—$0.36SiS_2$ (thio-LISICON Li ion conductor) | state: ceramics |
| $LiCoO_2 \, LiFePO_4$<br>$LiMn_{0.6}Fe_{0.4}PO_4$ | Li metal<br>$V_2O_5$ | $Li_3PO_{4-x}N_x$(LIPON) (lithium phosphate oxynitride glass) | state: glass |
| $LiNi_{0.8}Co_{0.15}Al_{0.05}O_2$ | Li metal | $Li_3InBr_3Cl_3$ (rock salt type Li ion conductor) | state: ceramics |
| — | — | $70Li_2S \cdot (30-x)P_2S_5 \cdot xP_2O_5$ ($Li_2S$—$P_2S_5$—$P_2O_5$ based glass ceramics) | state: glass |
| $LiCoO_2$ etc. | Li metal<br>Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$(LTP) (NASICON type structure) | state: ceramics |

TABLE 3

| Positive electrode material | Negative electrode material | Polymer base | Remarks |
|---|---|---|---|
| Ni based collector | Li metal | acrylonitrile vinyl acetate (PAN-VAc based gel electrolyte) | solvent: EC + PC<br>electrolyte salt: $LiBF_4$, $LiPF_6$, $LiN(CF_3SO_2)_2$ |
| lithium electrode | lithium electrode | triethylene glycolmethyl methacrylate (polymethyl methacrylate (PMMA) based gel electrolyte) | solvent: EC + PC<br>electrolyte salt: $LiBF_4$ |
| $V_2O_5$/PPy composite body | Li metal | methyl methacrylate (PMMA gel electrolyte) | solvent: EC + DEC<br>electrolyte salt: $LiClO_4$ |
| Li metal | Li metal | PEO/PS polymer blend gel electrolyte | solvent: EC + PC<br>electrolyte salt: $LiClO_4$ |
| Li metal | Li metal | alkylene oxide based polymer electrolyte | solvent: PC<br>electrolyte salt: $LiClO_4$ |
| Li metal & $LiCoO_2$ | Li metal | alkylene oxide based polymer electrolyte | solvent: EC + GBL<br>electrolyte salt: $LiBF_4$ |
| Li metal | Li metal | polyolefin based base polymer | solvent: EC + PC<br>electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC<br>electrolyte salt: $LiN(CF_3SO_2)_2$ |
| $LiCoO_2$ | Li metal | PEO based and acryl based polymer | solvent: EC + PC<br>electrolyte salt: $LiBF_4$ |
| Li metal | Li metal | trimethylol propane ethoxylate acrylate (ether based polymer) | solvent: PC<br>electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC<br>electrolyte salt: $LIPF_6$ |
| — | PAS (polyacene) | PVdF-HFP gel electrolyte | solvent: PC, EC + DEC<br>electrolyte salt: $LiClO_4$, $Li(C_2F_5SO_2)_2N$ |
| — | — | urea based lithium polymer gel electrolyte | solvent: EC + DMC electrolyte salt: $LiPF_6$ |
| — | — | polyether/polyurethane based (PEO-NCO) gel electrolyte | solvent: PC<br>electrolyte salt: $LiClO_4$ |
| — | — | cross-linked polyalkylene oxide based gel polymer electrolyte | — |

In most cases, the electrolyte used in a secondary battery is liquid. By way of example, in a lead storage battery, dilute sulfuric acid is used as the electrolytic solution. Further, positive electrode collector plate 23 and negative electrode collector plate 21 have some strength. In the present embodiment, a plurality of bipolar secondary batteries 4 are each sandwiched by positive electrode collector plate 23 and negative electrode collector plate 21. When positive electrode collector plate 23 and negative electrode collector plate 21 are sandwiched by bipolar secondary batteries 4, a gap between positive electrode collector plate 23 and bipolar secondary battery 4 or between negative electrode collector plate 21 and bipolar secondary battery 4 can be eliminated.

It should be understood that the embodiments disclosed herein are illustrative and non-restrictive in any respect. The scope of the present invention is defined by the terms of the claims, and is intended to include any modifications within the scope and meaning equivalent to the terms of the claims. Furthermore, the numerical values and the like indicated above are exemplarily indicated and the present invention is not limited to the above indicated numerical values and ranges.

INDUSTRIAL APPLICABILITY

The present invention is suitable for a bipolar secondary battery configured of a plurality of battery modules stacked in layers.

The invention claimed is:

1. A secondary battery comprising:
a plurality of battery modules, each battery module including an electrolyte layer in a form of a plate, a positive electrode disposed on a first main surface of said electrolyte layer and containing a positive electrode active material and a first additive, and a negative electrode disposed on a second main surface of said electrolyte layer and containing a negative electrode active material and a second additive; and
a conductive layer disposed between battery modules, the secondary battery having more than one said battery module and more than one said conductive layer stacked in layers,
wherein each positive electrode has the same total mass of the positive electrode active material and the first additive;
wherein each negative electrode has the same total mass of the negative electrode active material and the second additive; and
wherein said positive electrode active material and said negative electrode active material are varied in content to be set in concentration in accordance with a temperature distribution in the secondary battery.

2. The secondary battery according to claim 1, wherein:
said battery modules include a first battery module and a second battery module becoming higher in temperature than said first battery module; and
said positive electrode active material and said negative electrode active material contained in said second battery module are lower in concentration than said positive electrode active material and said negative electrode active material contained in said first battery module.

3. The secondary battery according to claim 1, wherein:
said first additive and said second additive are added in an amount set in accordance with said temperature distribution in the secondary battery.

4. A secondary battery comprising:
a plurality of battery modules, each battery module including an electrolyte layer in a form of a plate, a positive electrode disposed on a first main surface of said electrolyte layer and containing a positive electrode active material and a first additive, and a negative electrode disposed on a second main surface of said electrolyte layer and containing a negative electrode active material and a second additive, and
a conductive layer disposed between battery modules, the secondary battery having more than one said battery module and more than one said conductive layer stacked in layers,
wherein each positive electrode has the same total mass of the positive electrode active material and the first additive;
wherein each negative electrode has the same total mass of the negative electrode active material and the second additive;
wherein said more than one said battery module has higher temperatures at inner portions of the secondary battery than at an end face of the secondary battery in a direction in which said battery modules are stacked in layers; and
wherein said positive electrode and said negative electrode contain said positive electrode active material and said negative electrode active material, respectively, tapered in concentration from said end face of the secondary battery toward said inner portions of the secondary battery in said direction in which said battery modules are stacked in layers.

5. The secondary battery according to claim 4, wherein said battery module located at said inner portion as seen in said direction in which said battery modules are stacked in layers provides an output serving as a reference output, and each said battery module has said positive electrode and said negative electrode containing said positive electrode active material and said negative electrode active material, respectively, set in concentration to allow each said battery module to provide said reference output.

6. The secondary battery according to claim 4, wherein said battery module located at said end face provides an output serving as a reference output, and each said battery module has said positive electrode and said negative electrode containing said positive electrode active material and said negative electrode active material, respectively, set in concentration to allow each said battery module to provide said reference output.

* * * * *

UNITED STATES PATENT AND TRADEMARK OFFICE
CERTIFICATE OF CORRECTION

PATENT NO. : 8,642,208 B2  Page 1 of 1
APPLICATION NO. : 12/373647
DATED : February 4, 2014
INVENTOR(S) : Yoshiyuki Nakamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this
Twenty-ninth Day of September, 2015

Michelle K. Lee
*Director of the United States Patent and Trademark Office*